| (12) | United States Patent | (10) Patent No.: | US 11,156,306 B2 |
|---|---|---|---|
| | Yokoe | (45) Date of Patent: | Oct. 26, 2021 |

(54) MOTOR AND VALVE DRIVE DEVICE

(71) Applicant: NIDEC SANKYO CORPORATION, Nagano (JP)

(72) Inventor: Satoru Yokoe, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 231 days.

(21) Appl. No.: 16/425,134

(22) Filed: May 29, 2019

(65) Prior Publication Data

US 2019/0368629 A1 Dec. 5, 2019

(30) Foreign Application Priority Data

May 31, 2018 (JP) .............................. JP2018-104893

(51) Int. Cl.
| *F16K 31/04* | (2006.01) |
|---|---|
| *H02K 21/14* | (2006.01) |
| *H02K 7/116* | (2006.01) |
| *H02K 1/27* | (2006.01) |

(52) U.S. Cl.
CPC ............ *F16K 31/043* (2013.01); *H02K 1/278* (2013.01); *H02K 7/116* (2013.01); *H02K 21/14* (2013.01)

(58) Field of Classification Search
CPC ......... H02K 1/278; H02K 7/116; H02K 21/14
See application file for complete search history.

(56) References Cited

U.S. PATENT DOCUMENTS

| 9,746,087 B2 * | 8/2017 | Yokoe ................... F16K 31/041 |
|---|---|---|
| 2014/0362672 A1 | 12/2014 | Saito |
| 2015/0276070 A1 | 10/2015 | Yokoe et al. |

FOREIGN PATENT DOCUMENTS

| CN | 104704273 A | 6/2015 |
|---|---|---|
| CN | 107394928 A | 11/2017 |
| JP | H118954 A | 1/1999 |
| JP | 5615993 B1 | 10/2014 |
| JP | 2014236650 A | 12/2014 |

* cited by examiner

*Primary Examiner* — Eric Keasel

(74) *Attorney, Agent, or Firm* — Cantor Colburn LLP

(57) ABSTRACT

To suppress variation, among rotors, in a relative position between the position of magnetic poles of a magnet and the rotation position (for example, the position of teeth of a pinion) of an integral rotation unit configured to rotate integrally with the rotor main body. A motor includes: a rotor including a magnet fixed to an outer periphery of a rotor main body, and an integral rotation unit assembled to the rotor main body; and a spindle configured to rotatably support the rotor. The magnet includes a positioning marker used when the rotor main body is fixed to the magnet, and the integral rotation unit and the rotor main body are configured to be capable of being assembled in a set relative arrangement.

11 Claims, 18 Drawing Sheets

MOTOR AND VALVE DRIVE DEVICE

CROSS-REFERENCE TO RELATED APPLICATION

The present application claims priority under 35 U.S.C. § 119 to Japanese Patent Application No. 2018-104893, filed on May 31, 2018, the entire contents of which are incorporated herein by reference.

FIELD OF THE INVENTION

At least an embodiment of the present invention relates to a motor, and more particularly, a motor in which a rotor is rotatably supported on a spindle, and also to a valve drive device including such a motor.

BACKGROUND

Examples of this type of motor include a motor described in Japanese Patent No. 5615993. The motor includes: a rotor having a rotor main body fixed to an inner periphery of a cylindrically shaped magnet, and a pinion assembled on the rotor main body; and a spindle configured to rotatably support the rotor. Usually, when a rotor is manufactured, the rotor main body made of a resin material is fixed by insert-molding to the magnet in which an N pole and an S pole of the magnet are alternately magnetized in a circumferential direction, which is followed by fitting the pinion into the rotor main body for fixation.

In the rotor of the motor, when the magnet is manufactured by magnetizing a cylindrically shaped pre-magnetization base material (such as a ferrite material) so that the N poles and the S poles are alternately arranged in a circumferential direction, an error (error in manufacture) occurs in the magnetized position of each of the magnetic poles. Next, an error (error in manufacture) also occurs when the rotor main body is fixed by insert molding to the magnet in which each of the magnetic poles is magnetized. Further, an error (error in assembly) also occurs while the pinion is fitted and assembled to the rotor main body fixed to the magnet.

Among the above-mentioned errors, conventionally, the error in manufacture is taken into consideration. However, the error in assembly is not taken into consideration.

As a result, conventionally, a positional deviation caused by a combination of the "error in manufacture" and the "error in assembly" is not taken into consideration.

Therefore, there is a problem that a relative position between the position of the magnetic poles of the magnet and that of teeth of the pinion varies among rotors.

For example, a motor used to rotate a valve element for switching flow paths, such as a refrigerant valve of a refrigerator, may need to accurately align the positions of the teeth of the pinion with the amount of rotation of the rotor. In such an application, it is not easy for the motor having the conventional rotor to accurately align the positions.

An object of at least an embodiment of the present invention is to suppress variation, among rotors, in a relative position between the position of magnetic poles of a magnet and the rotation position (for example, the position of teeth of a pinion) of an integral rotation unit configured to rotate integrally with a rotor main body.

SUMMARY

According to one aspect of the present disclosure, there is provided a motor including: a rotor having a magnet fixed to an outer periphery of a rotor main body, and an integral rotation unit assembled to the rotor main body; and a spindle configured to rotatably support the rotor. The magnet includes a positioning marker that is used when the rotor main body is fixed to the magnet, and the integral rotation unit and the rotor main body are configured to be capable of being assembled in a set relative arrangement.

Here, "capable of being assembled in a set relative arrangement" means that the relative arrangement between the integral rotation unit and the rotor main body cannot be assembled in a free relative arrangement, but can be assembled in at least one limited relative arrangement.

According to this aspect, the magnet includes a positioning marker that is used when the rotor main body is fixed to the magnet, and thus, by using this positioning marker as a reference position, when the magnet is manufactured by magnetizing a cylindrically shaped pre-magnetization base material so that N poles and S poles are alternately arranged in the circumferential direction, it is possible to arrange each of the magnetic poles relative to one reference position being the positioning marker. As a result, variation in the magnetized position of each of the magnetic poles can be reduced.

Then, when the rotor main body is integrally fixed to the magnet in which each of the magnetic poles is magnetized by insert molding or the like, the position of the rotor main body with respect to the position of each of the magnetic poles of the magnet can be arranged relative to one reference position being the positioning marker.

Further, since the integral rotation unit such as the pinion and the rotor main body are configured to be capable of being assembled in the set relative arrangement, the integral rotation unit can arrange the position of the integral rotation unit with respect to the position of each of the magnetic poles of the magnet via the rotor main body, relative to one reference position being the positioning marker.

Therefore, it is possible to suppress positional deviation caused by a combination of the "error in manufacture" and the "error in assembly". That is, it is possible to suppress variation, among rotors, in a relative position between the position of each of the magnetic poles of the magnet and the integral rotation unit, for example, teeth of the pinion.

In the motor according to at least an embodiment of the present invention, the rotor main body is fixed to the magnet by insert molding.

At least an embodiment of the present invention can be effectively applied to a motor including a rotor having a structure in which the rotor main body is fixed to the magnet by insert molding.

In the motor according to at least an embodiment of the present invention, the positioning marker is a notch formed in the magnet.

According to this aspect, since the positioning marker has a mechanical structure, that is, a notch, it is easy to use as a marker.

In the motor according to at least an embodiment of the present invention, the positioning marker is provided at a position where the magnetic poles are switched in the circumferential direction of the magnet.

When the notch is provided at the position of one magnetic pole, if a slight crack is generated from the notch, a problem occurs that a repulsive force between the same poles is generated and the magnet is easily damaged. However, according to this aspect, since the positioning marker is provided at the position where the magnetic poles are switched in the circumferential direction of the magnet, it is less likely that the problem occurs.

In the motor according to at least an embodiment of the present invention, the integral rotation unit and the rotor main body are fixed by fitting at least one concave unit and at least one convex unit to each other.

According to this aspect, the integral rotation unit and the rotor main body are fixed when the at least one concave unit and the at least one convex unit are fitted, and thus, a fixing structure is simple.

In the motor according to at least an embodiment of the present invention, the at least one concave unit is formed in the rotor main body, and the at least one convex unit is formed in the integral rotation unit.

According to this aspect, the at least one concave unit is formed in the rotor main body, and the at least one convex unit is formed in the integral rotation unit, and thus, the fixing structure is simple.

In the motor according to at least an embodiment of the present invention, the at least one concave unit and the at least one convex unit are each formed in plurality, one of the plurality of concave units is different in shape from the other concave units, one of the plurality of convex units is different in shape from the other convex units, and the integral rotation unit and the rotor main body can be assembled in a relative arrangement in which the one concave unit and the one convex unit are fitted to each other.

According to this aspect, it is possible to easily realize a structure in which the integral rotation unit and the rotor main body can be assembled in the set relative arrangement.

In the motor according to at least an embodiment of the present invention, the at least one concave unit and the at least one convex unit are each formed in plurality, a circumferential spacing for a set including a concave unit among the plurality of concave units is different in length from another circumferential spacing for a different set including a different concave unit, a circumferential spacing for a set including a convex unit among the plurality of convex units is different in length from another circumferential spacing for a different set including a different convex unit, and the integral rotation unit and the rotor main body are capable of being assembled in a relative arrangement in which the sets including the concave units and the convex units, which are positioned with the different spacings in length therebetween, are fitted to each other.

According to this aspect, as in the above aspect, it is possible to easily achieve a structure in which the integral rotation unit and the rotor main body can be assembled in the set relative arrangement. Further, if used in combination with the above-mentioned aspect, the assembly of the integral rotation unit and the rotor main body in the set relative arrangement is further ensured.

In the motor according to at least an embodiment of the present invention, the integral rotation unit is a power output member provided with a pinion, and includes at least one convex unit in a site not interfering with a surface where teeth of the pinion are present.

According to this aspect, the integral rotation unit is a power output member provided with a pinion, and is provided with at least one abutment convex unit in a site not interfering with a surface where teeth of the pinion are present. In this structure, the abutment convex unit also generates an error in the assembly in the magnetic pole as in the case of the teeth of the pinion; however, according to this aspect, it is possible to arrange the abutment convex unit relative to one reference position being the positioning marker. As a result, the error in assembly between the integral rotation unit including the abutment convex unit and the rotor main body can be reduced.

A valve drive device according to at least an embodiment of the present invention includes: a base including a fluid inlet, a fluid outlet, and a valve seat surface, at least one of the fluid inlet and the fluid outlet being opened at the valve seat surface; a cover configured to define, between the valve seat surface and the cover, a valve chamber with which the fluid inlet and the fluid outlet communicate; a valve element rotatably arranged in the valve chamber, having a contact surface sliding on the valve seat surface, and configured to rotate to switch a flow path of a fluid; and a valve element drive mechanism configured to rotate the valve element about an axis orthogonal to the valve seat surface, wherein the valve element drive mechanism rotates the valve element by using, as a power source, the motor described in the above aspects.

According to this aspect, in the valve drive device provided with the valve element drive mechanism configured to adjust the flow rate of a fluid, the effect of each of the aspects can be obtained by rotating the valve element by using the motor according to any one of the aspects as a power source of the valve element drive mechanism.

In the valve drive device according to at least an embodiment of the present invention, one end of the spindle of the motor is fixed non-rotatably to the base, a power output member including a pinion arranged between the base and the rotor main body at the one end side of the spindle is provided, and the valve element is configured to rotate via a reduction gear meshing with the pinion.

According to this aspect, the valve element is configured to rotate via the reduction gear meshing with the pinion. As a result, it is possible to decelerate and transmit the rotation of the motor by the reduction gear.

According to at least an embodiment of the present invention, it is possible to provide a motor capable of suppressing variation, among rotors, in a relative position between the position of magnetic poles of a magnet and the rotational position (for example, the position of teeth of a pinion) of an integral rotation unit configured to rotate integrally with a rotor main body, and a valve drive device including the same.

BRIEF DESCRIPTION OF THE DRAWINGS

Embodiments will now be described, by way of example only, with reference to the accompanying drawings which are meant to be exemplary, not limiting, and wherein like elements are numbered alike in several Figures.

DETAILED DESCRIPTION

Figure 1:
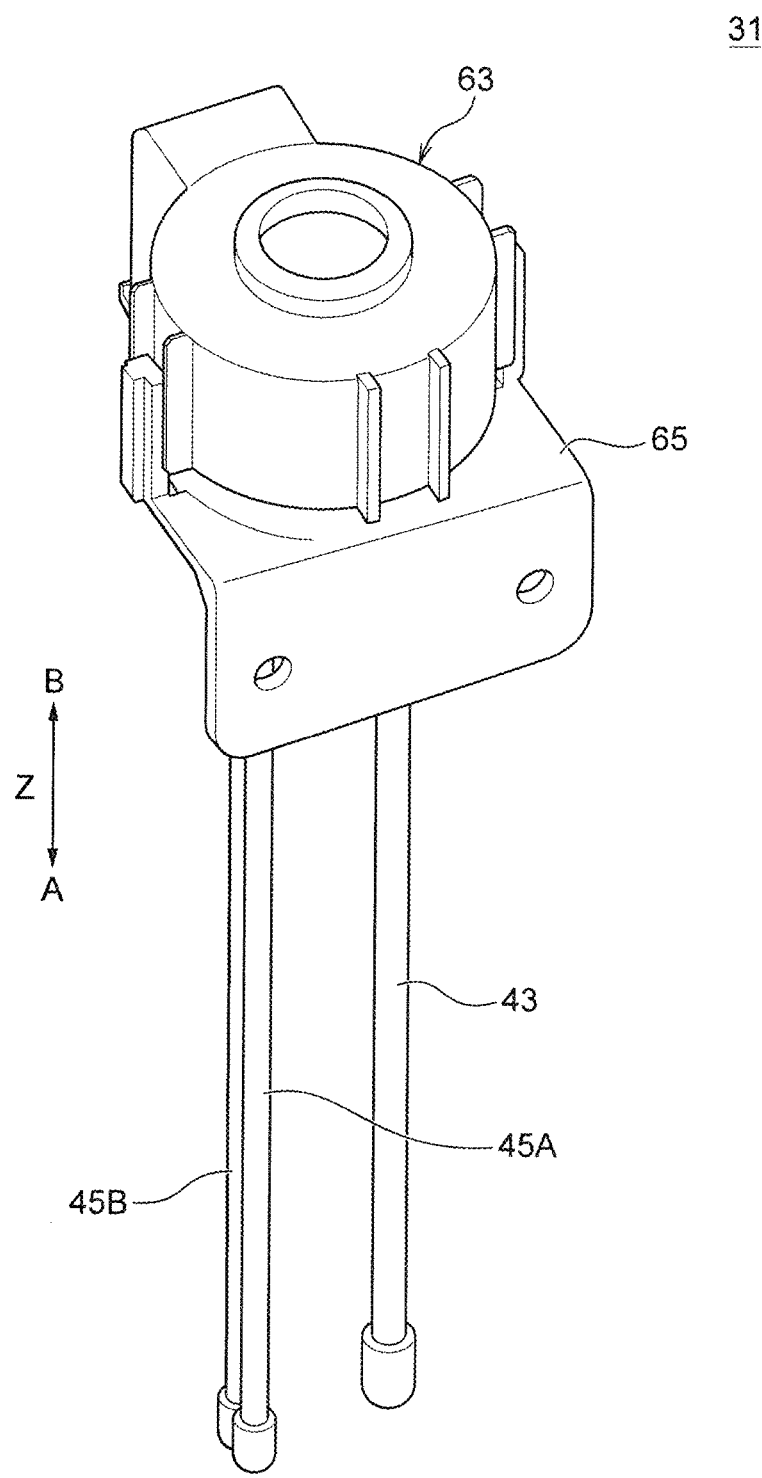
FIG. 1 is a view illustrating at least an embodiment of the present invention or a perspective view illustrating an appearance of a valve drive device.
Figure 2:
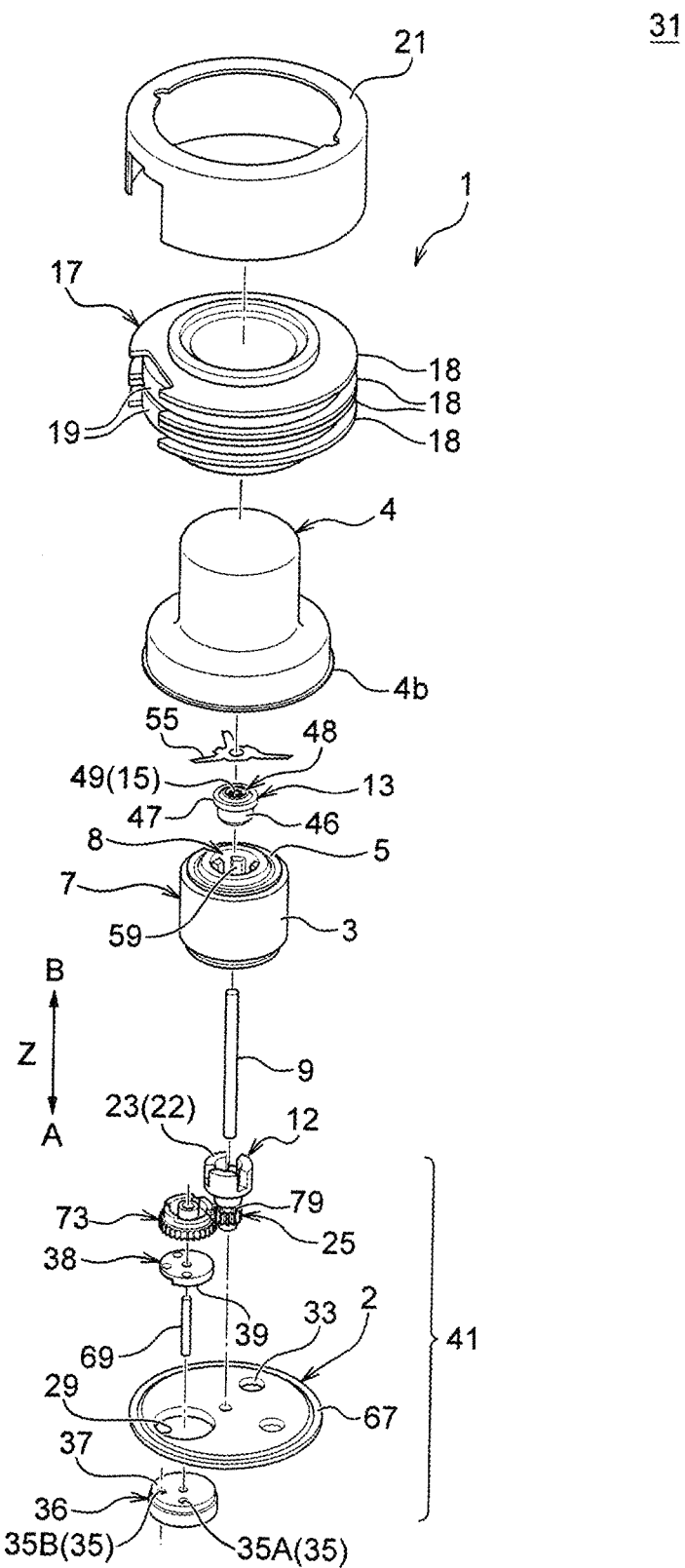
FIG. 2 is a view illustrating at least an embodiment of the present invention or an exploded perspective view illustrating an internal structure of the valve drive device.

A motor and a valve drive device according to at least an embodiment of the present invention will be described in detail with reference to an embodiment illustrated in FIG. 1 to FIG. 7, FIG. 8A and FIG. 8B, FIG. 9 to FIG. 16, and FIG. 17 based on these drawings, below.

It is noted that in the following description, first, a brief configuration of the motor of the present embodiment and a brief configuration of the valve drive device of the present embodiment including the motor will be described based on FIG. 1 to FIG. 8B.

Next, based on FIG. 3 to FIG. 11, a specific configuration, an operation, and an effect of the motor of the present embodiment will be described.

Next, a specific configuration of the valve drive device according to the present embodiment will be described based on FIG. 1 to FIG. 4 and FIG. 12 to FIG. 15. Subsequently, an operation mode of the valve drive device of the present embodiment will be described based on FIG. 16 and FIG. 17 focusing on a relationship between a rotation angle (number of step S) of a valve element and an opening/closing operation of the valve element. Thereafter, the operation and effect of the valve drive device of the present embodiment will be described.

Finally, another embodiment of the present invention will be briefly described, which differs in partial configuration from the present embodiment configured as described above.

(1) Brief Configuration of Motor (See FIG. 1 to FIG. 8B)

A motor 1 according to at least an embodiment of the present invention includes: a rotor 7 having a magnet 3 fixed to an outer periphery of a rotor main body 5, and an integral rotation unit 12 assembled to the rotor main body 5; and a spindle 9 configured to rotatably support the rotor 7.

The magnet 3 includes a positioning marker 85 that is used when the rotor main body 5 is fixed to the magnet 3, and the integral rotation unit 12 and the rotor main body 5 are configured to be capable of being assembled in a set relative arrangement.

Here, "capable of being assembled in a set relative arrangement" means that the integral rotation unit 12 and the rotor main body 5 are not allowed to be assembled in an arbitrary relative arrangement of the integral rotation unit 12 and the rotor main body 5, but can be assembled in at least one limited relative arrangement therebetween. Specifically, relative positions of the integral rotation unit 12 and the rotor main body 5 with respect to each other cannot be changed in a circumferential direction R. This means that the integral rotation unit 12 and the rotor main body 5 can be assembled only in a uniquely determined set relative arrangement.

Further, in the illustrated motor 1, at one end A side in a longitudinal direction Z of the spindle 9 of the rotor 7, the integral rotation unit 12 is positioned below a first bearing unit 11 slidably provided in a state of having a clearance relative to the spindle 9, as an example.

Further, at the other end B side in the longitudinal direction Z of the spindle 9 of the rotor 7, a second bearing unit 13 including an elastic bearing unit 15, as an example of slidably contacting in a state of being elastically pressed against the spindle 9, is provided.

Further, in the spindle 9 to which the rotor 7 is attached via the first bearing unit 11 and the second bearing unit 13, the one end A of the spindle 9 is fixed non-rotatably (in a fixed state) to the disc-shaped base 2, as an example, of the motor 1. On the other hand, the other end B of the spindle 9 is attached unfixedly in a rotation direction R while being fitted into a concave unit 4a formed on a top board of a cover 4 raised upward, in FIG. 3 and FIG. 4, from a peripheral edge of the base 2.

In addition, a stator 17 including a stator core 18 and a coil 19 is arranged on an outer periphery of the rotor 7 with the cover 4 interposed therebetween. A housing 21 configured to cover a part of a top surface and an outer peripheral surface of the stator 17 is provided outside the stator 17 as an example.

Figure 3:
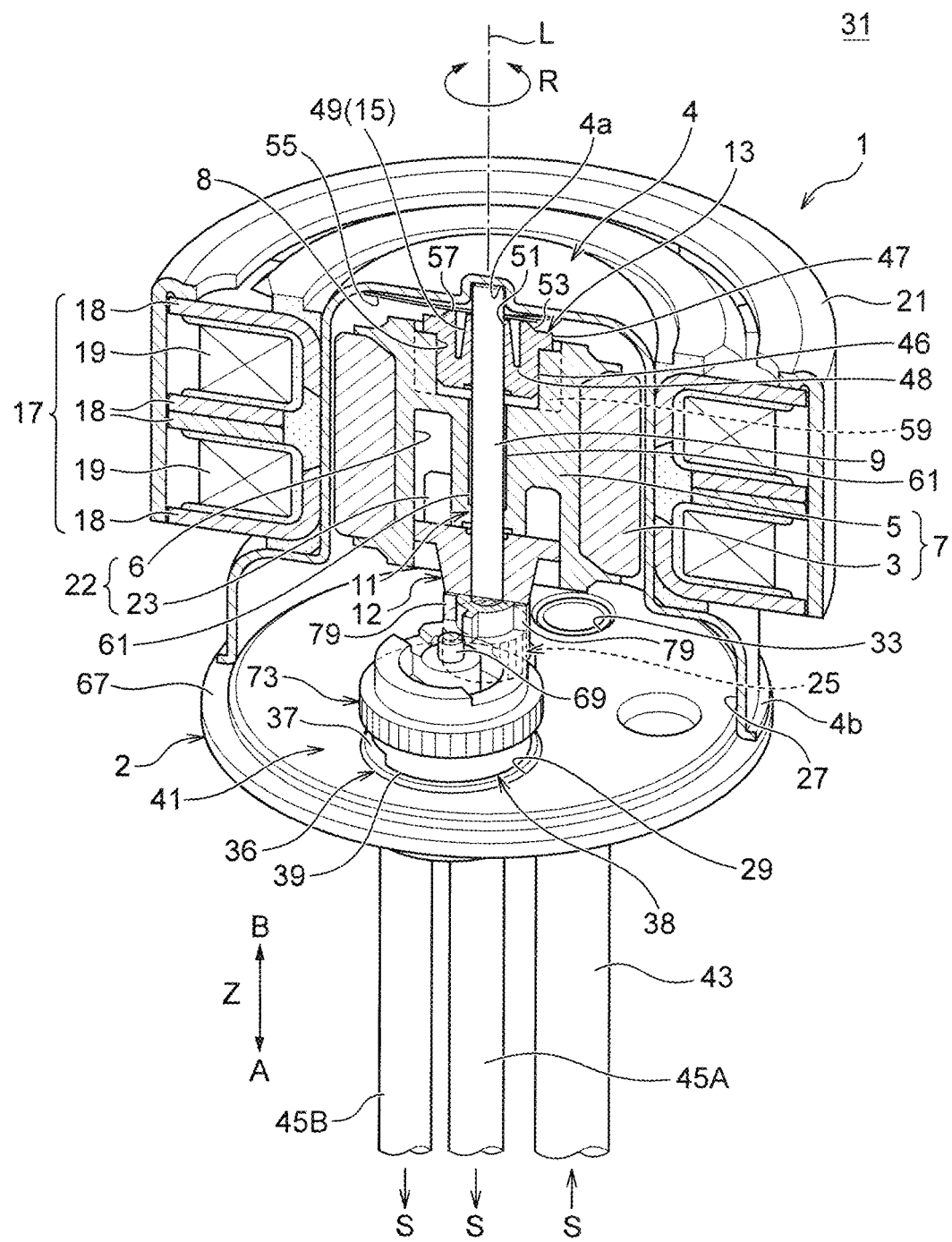
FIG. 3 is a view illustrating at least an embodiment of the present invention or a perspective view illustrating a partially cut valve drive device.
Figure 4:
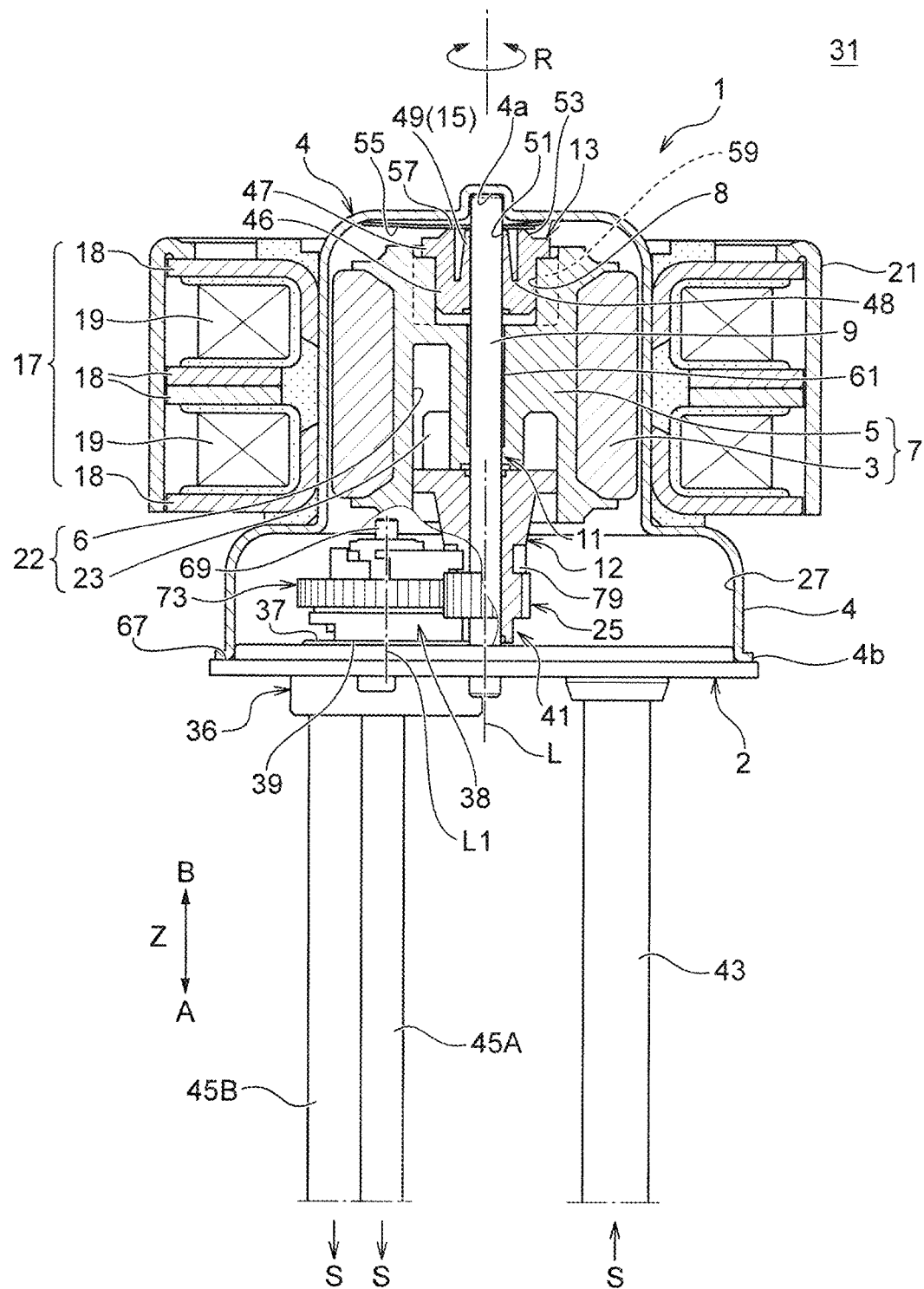
FIG. 4 is a view illustrating at least an embodiment of the present invention or a lateral sectional view illustrating a motor and the valve drive device.

Further, in the present embodiment, at an upper position in the integral rotation unit 12 in FIG. 3 and FIG. 4, a convex unit 23 engaged with an engagement concave unit 6 provided in the rotor main body 5 is arranged, and a relative arrangement between the rotor main body 5 and the integral rotation unit 12 is uniquely defined by a concave-convex fitting structure 22 including the engagement concave unit 6 and the convex unit 23. With this configuration, the rotor main body 5 and the integral rotation unit 12 are together rotated around a rotation center being the spindle 9.

Further, at a lower position of the integral rotation unit 12 in FIG. 3 and FIG. 4, a pinion 25 being a main component of a power output member configured to output a rotational motion generated by the motor 1 to the outside is integrally provided.

(2) Brief Configuration of Valve Drive Device (See FIG. 1 to FIG. 4)

A valve drive device 31 according to the present embodiment includes a fluid inlet 33, and the base 2 including a valve seat 36 having a fluid outlet 35 and a valve seat surface 37, at least one of the fluid inlet 33 and the fluid outlet 35 being opened at the valve seat surface 37, the cover 4 defining, between the valve seat surface 37 and the cover 4, a valve chamber 27 with which the fluid inlet 33 and the fluid outlet 35 communicate, and a contact surface 39 being rotatably arranged in the valve chamber 27 and sliding on the valve seat surface 37. Further, a valve element 38 configured to switch a flow path of a fluid S by rotation, and a valve element drive mechanism 41 configured to rotate the valve element 38 about an axis L1 (FIG. 4, FIG. 9, FIG. 13, and FIG. 14) orthogonal to the valve seat surface 37 are provided.

The valve element drive mechanism 41 uses the embodiment-based motor 1, as a power source, including the above-described rotor 7, spindle 9, and integral rotation unit 12.

Further, in the present embodiment, the spindle 9 of the motor 1 is raised from a center of the base 2, and the fluid inlet 33 and an opening 29 configured to attach the valve seat 36 are formed in an outer region of the spindle 9.

The valve seat 36 attached to the opening 29 is formed with two fluid outlets 35, that is, a first fluid outlet 35A and a second fluid outlet 35B. As illustrated in FIG. 3 and FIG. 4, the fluid inlet 33, the first fluid outlet 35A, and the second fluid outlet 35B are connected respectively with one inflow pipe 43 and two outflow pipes 45A, 45B extending downward, respectively.

(3) Specific Configuration of Motor (See FIG. 3 to FIG. 11)

In the present embodiment, the motor 1 is configured by a stepping motor as an example. The second bearing unit 13 of the motor 1 includes a cylinder-like main body 46, as an example, formed with a flange unit 47 protruding in a horizontal direction, and the elastic bearing unit 15, at an upper part thereof as illustrated. In the elastic bearing unit 15, a concave unit 48 with a predetermined depth is formed at a center of the main body 46. Then, as an example, three elastic arm units 49 are arranged to extend from a bottom surface of the concave unit 48, in the longitudinal direction Z of the spindle 9 and in a direction away from the integral rotation unit 12 (at the upper part of FIG. 3, FIG. 4), to configure the elastic bearing unit 15.

The elastic arm units 49 are each formed of a plate material curved in an arc shape around the axis L of the spindle 9, and a width dimension and a thickness of the plate material are sized, as an example, to be slightly large at a base unit side connected to the bottom surface of the concave unit 48 and to be slightly small at a contact unit 51 at an arm distal end side slidably contacting the spindle 9.

Further, before the spindle 9 is inserted, a diameter of an inner surface of the contact unit 51 at a distal end of the three elastic arm units 49 is formed slightly smaller than an outer diameter of the spindle 9. As a result, in this configuration, if the spindle 9 is inserted into an interior surrounded by the three elastic arm units 49, the contact unit 51 contacts the outer diameter of the spindle 9, and thus, the three elastic arm units 49 are bent and deformed outward according to the outer diameter, and by a reaction force of the bending deformation, the contact unit 51 is pressed against the spindle 9.

Further, the three elastic arm units 49 are positioned at equal intervals in a circumferential direction of the spindle 9, and in the present embodiment, the three elastic arm units 49 are provided in the circumferential direction at three locations with intervals of 120°.

Further, on a top surface of the flange unit 47 of the main body 46, an enclosure unit 53 is provided which is raised upward along a circumferential surface of the concave unit 48 and is configured to enclose the three elastic arm units 49 from outside.

In the present embodiment, a height H1 of an arm distal end position of the elastic arm unit 49, when a direction of extension of the elastic arm unit 49 is defined as a height direction, is formed to be lower than a height H2 of the enclosure unit 53.

Further, in the present embodiment, the rotor main body 5 is integrally formed with the magnet 3 by insert molding as an example.

Further, in the present embodiment, the positioning marker 85 is configured by a notch 86 formed in the magnet 3. Specifically, the positioning marker 85 is configured by the notch 86 formed by two U-shaped grooves provided at positions opposed by 180° on a bottom surface (end surface at the one end A side) of the magnet 3.

Figure 11:
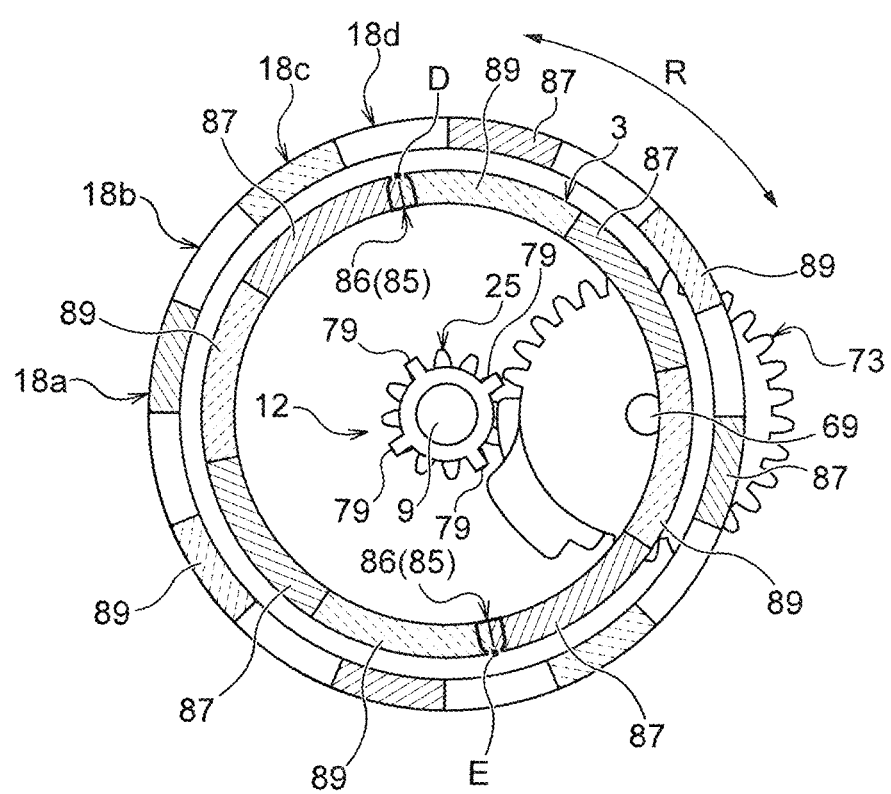
FIG. 11 is a view illustrating at least an embodiment of the present invention or a plan view illustrating a positional relationship between a magnet, a stator core, and a positioning marker.
Figure 12:
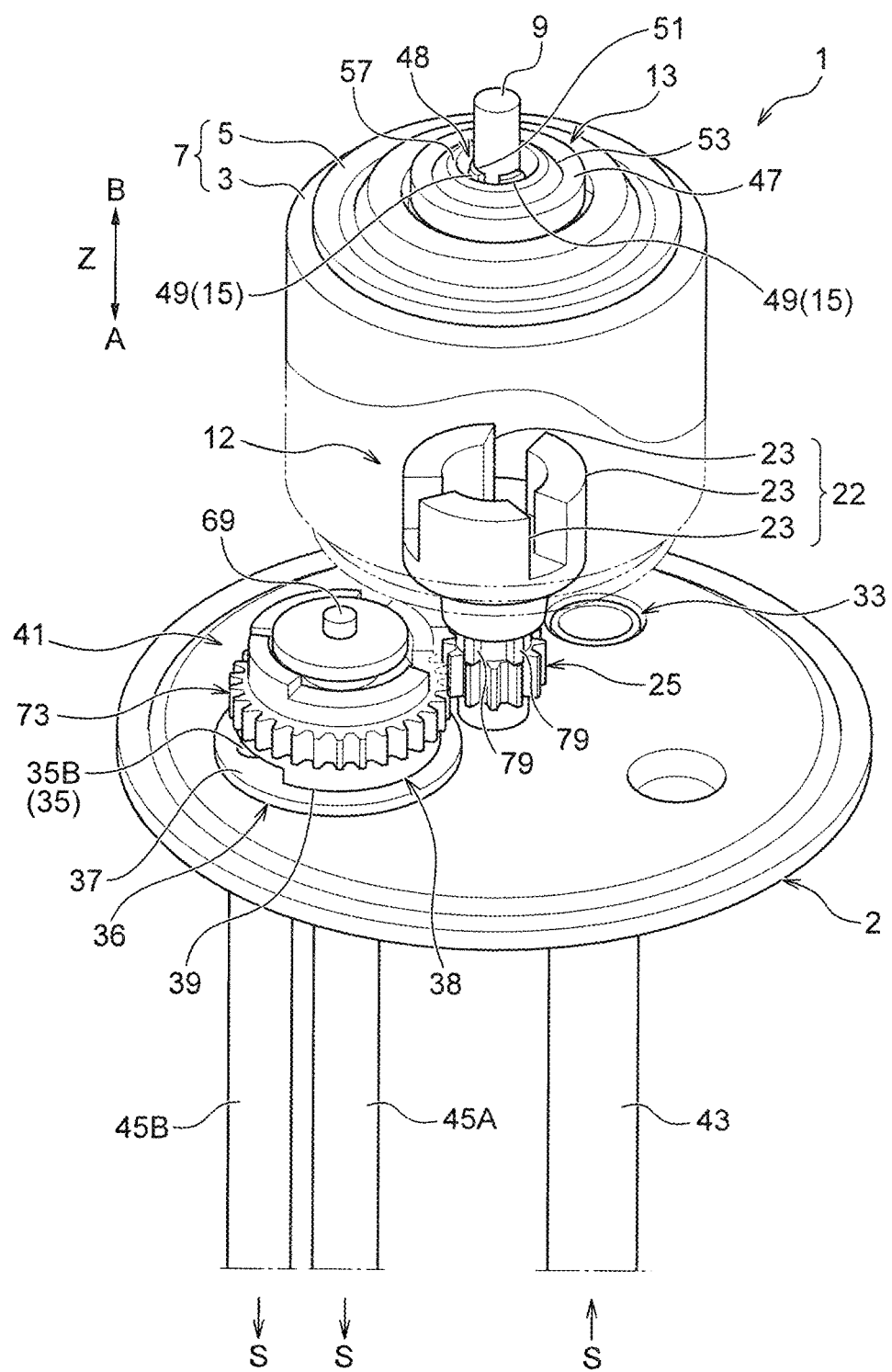
FIG. 12 is a view illustrating at least an embodiment of the present invention or a perspective view illustrating a valve drive device while a cover is removed.

Further, in the present embodiment, as illustrated in FIG. 11, the positioning marker 85 is provided at a position where magnetic poles are switched in the circumferential direction R of the magnet 3. Specifically, when four N poles 87 and S poles 89 each are alternately arranged in the circumferential direction R of the magnet 3, the positioning markers 85 configured by the notch 86 are formed at two locations, that is, a boundary position between the N pole 87 and the S pole 89 indicated by point D at an upper area of FIG. 11, and a boundary position between the S pole 89 and N pole 87 indicated by point E at an lower area of FIG. 11.

Figure 10:
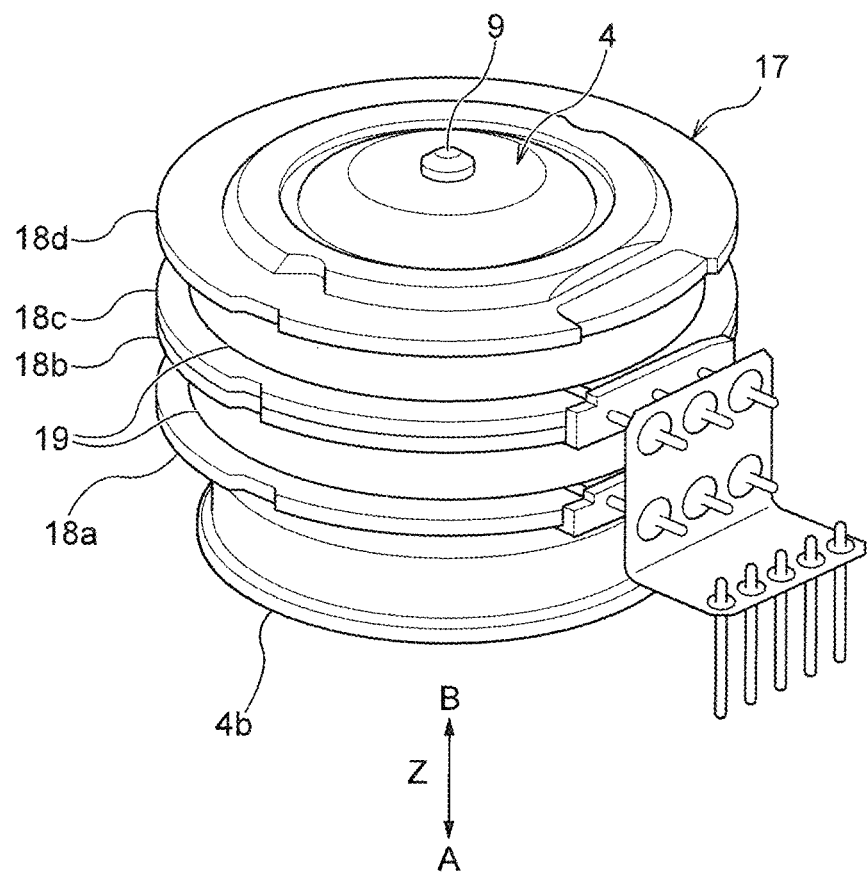
FIG. 10 is a view illustrating at least an embodiment of the present invention or a perspective view illustrating an appearance of a stator assembled to the rotor.

It is noted that stator cores 18a to 18d in FIG. 11 correspond to the stator cores 18a to 18d in FIG. 10.

Further, in the present embodiment, the engagement concave unit 6 and the convex unit 23 are formed of a plurality of engagement concave units 6 and convex units 23, respectively. In this configuration, one engagement concave unit 6a of the plurality of engagement concave units 6 is different in shape from the other engagement concave units 6b and 6c, one convex unit 23a of the plurality of convex units 23 is different in shape from the other convex units 23b, 23c, and the integral rotation unit 12 and the rotor main body 5 can be assembled in a relative arrangement in which the one engagement concave unit 6a and the one convex unit 23a are fitted to each other.

Figure 8A:
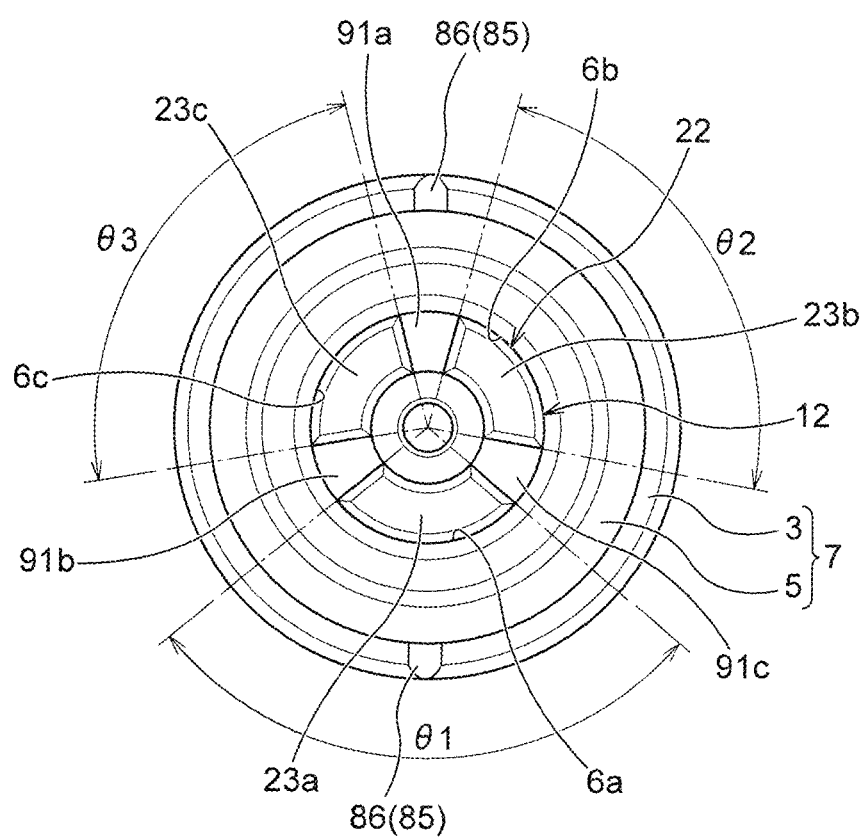
FIG. 8A is a view illustrating at least an embodiment of the present invention or a plan view illustrating a state where the integral rotation unit is assembled to the rotor.

Specifically, as illustrated in FIG. 8A, three engagement concave units 6a, 6b, 6c and three convex units 23a, 23b, 23c are provided with an equal spacing in the circumferential direction R. An angle θ1, which is indicative of a length of the circumferential direction R of a set of the engagement concave unit 6a and convex unit 23a among the above engagement concave units and the convex units, is set to 100°. Each of angles θ2 and θ3, which are indicative of lengths in the circumferential direction R of other sets of the engagement concave unit 6b and convex unit 23b and the engagement concave unit 6c and convex unit 23c, is set to 85°.

By employing such an engagement concave unit 6 and a convex unit 23, the relative arrangement of the integral rotation unit 12 and the rotor main body 5 in the circumferential direction R can be uniquely determined.

Figure 8B:
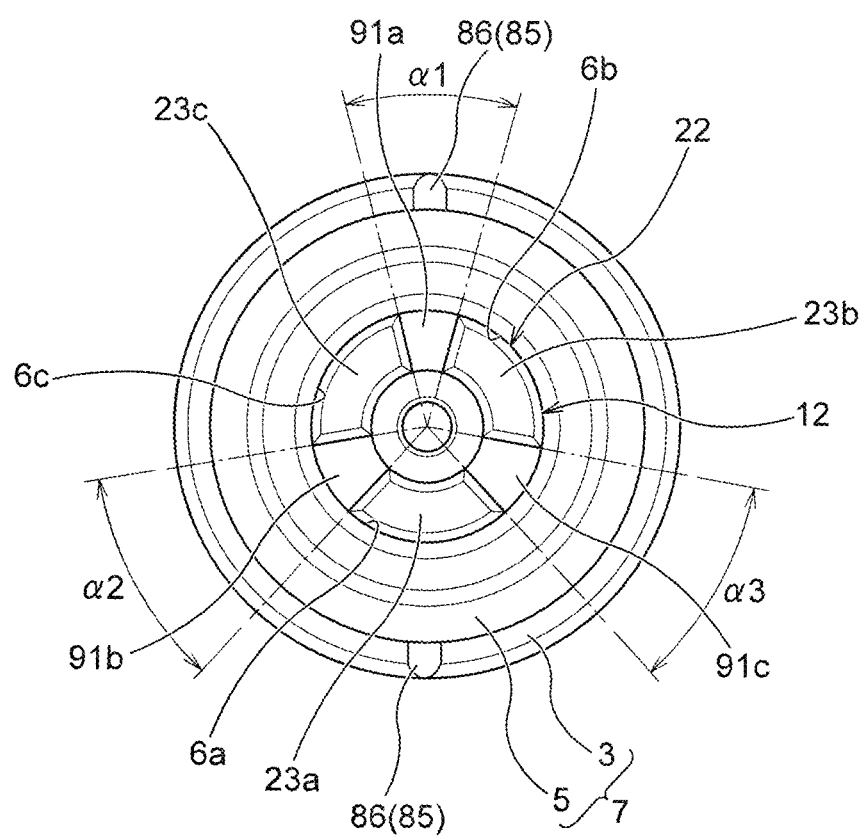
FIG. 8B is a view illustrating a modification of at least an embodiment of the present invention or a plan view illustrating a state where the integral rotation unit is assembled to the rotor.
Figure 9:
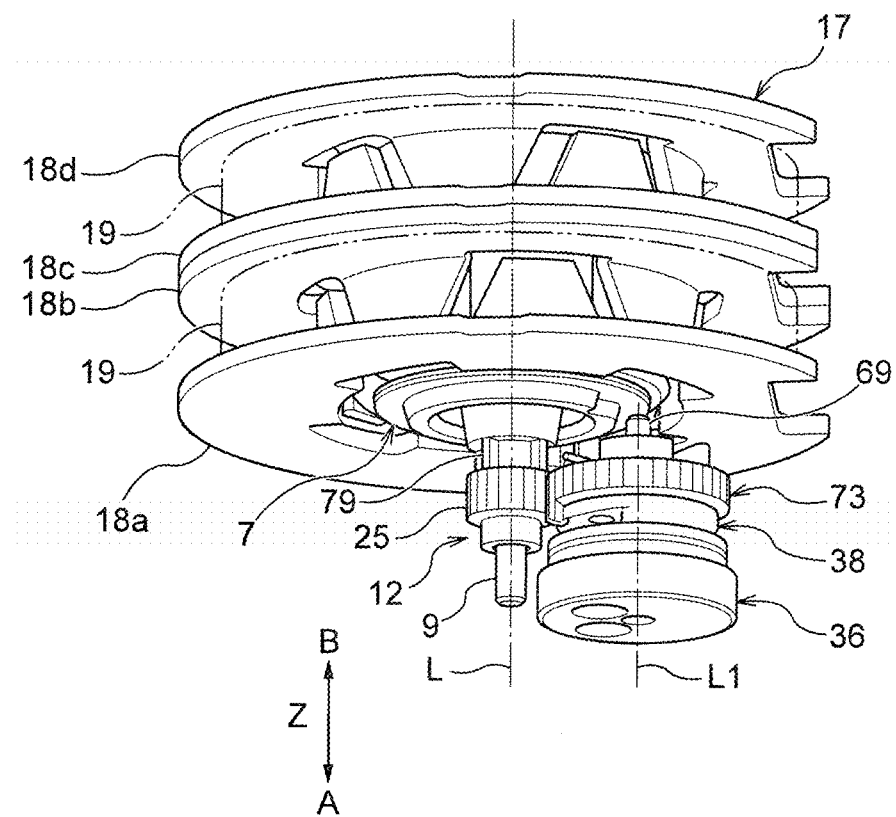
FIG. 9 is a view illustrating at least an embodiment of the present invention or a perspective view illustrating a state where the rotor, the integral rotation unit, and a valve element drive mechanism are assembled, as viewed diagonally from below.

Further, as illustrated in a modification of FIG. 8B, while three engagement concave units 6 and convex units 23 each are formed equally in shape, a spacing 91a in the circumferential direction R for one set of engagement concave unit 6 and convex unit 23 among the three sets of the engagement concave units 6 and convex units 23 is configured to be different in length from other spacings 91b and 91c, and thus, it is also possible to uniquely determine the relative arrangement in the circumferential direction R between the integral rotation unit 12 and the rotor main body 5.

In this case, in FIG. 8B, an angle indicative of the length in the circumferential direction R of the spacings 91a of the one set is α1, angles indicative of the lengths in the circumferential direction R of the spacings 91b, 91c of the remaining two sets are α2, α3, and a relationship among these angles is α1≠α2=α3.

Further, in the present embodiment, as illustrated in FIG. 3 and FIG. 4, an elastic member 55 configured by a spring washer like a plate spring, as an example, between the second bearing unit 13 and an inner surface of a top plate of the cover 4, is arranged in a contracting manner.

Figure 5:
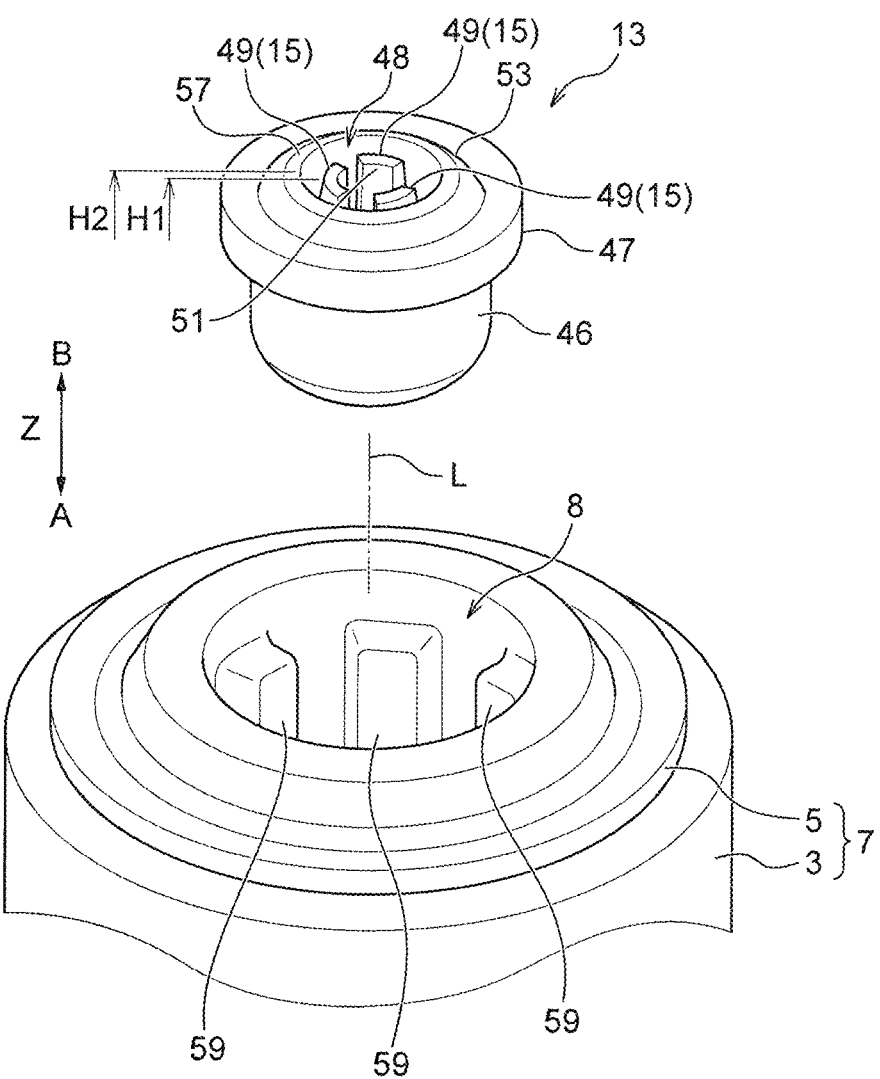
FIG. 5 is a view illustrating at least an embodiment of the present invention or a perspective view illustrating a second bearing member.
Figure 6:
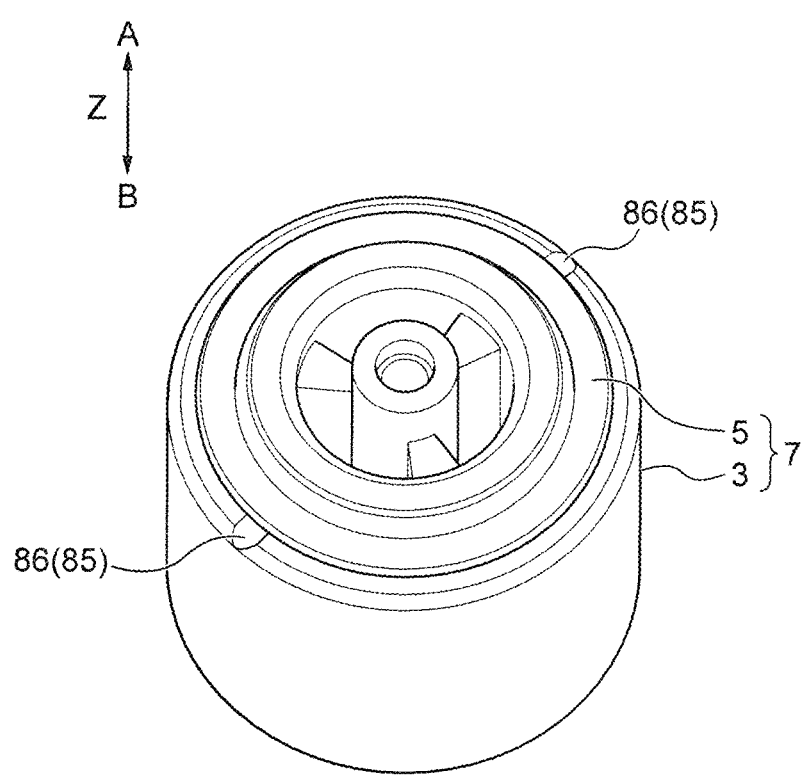
FIG. 6 is a view illustrating at least an embodiment of the present invention or a perspective view illustrating a rotor in which a magnet and a rotor main body are assembled, when a lower surface of the rotor is placed upward.
Figure 7:
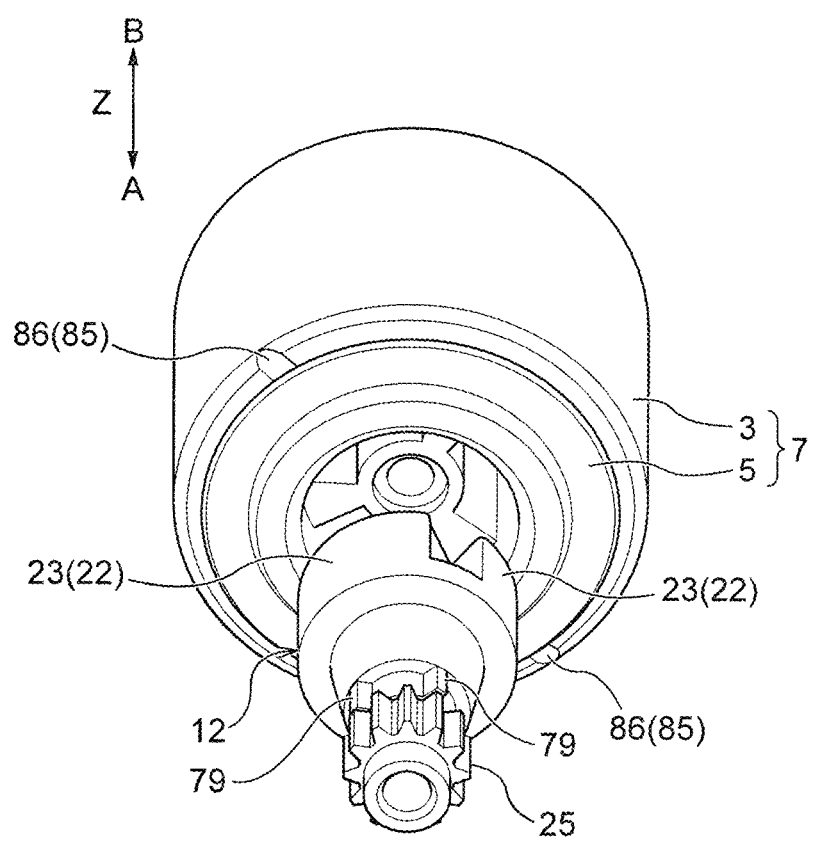
FIG. 7 is a view illustrating at least an embodiment of the present invention or an exploded perspective view illustrating a state where the integral rotation unit is assembled to the rotor, as viewed diagonally from below.

Then, as illustrated in FIG. 5, the top surface of the enclosure unit 53 of the second bearing unit 13 acts as a receiving unit 57 against which the elastic member 55 abuts. In this configuration, the receiving unit 57 receives an urging force of the elastic member 55 toward the one end A side, and thereby prevents the second bearing unit 13 from falling and moving upward.

Further, a radius of curvature of the inner surface of the contact unit 51 at a distal end of the three elastic arm units 49 is set to be substantially the same as a radius of curvature of the outer diameter of the spindle 9 in contact. As a result, the elastic bearing unit 15 is configured to be in surface contact with the spindle 9.

Further, in the present embodiment, in this configuration, the second bearing unit 13 is formed of a different member from the rotor main body 5, and integrally rotates with engaged with the rotor main body 5. That is, in this configuration, when the main body 46 of the second bearing unit 13 is inserted into the concave unit 8 formed in the rotor main body 5 for mutual engagement, the second bearing unit 13 is rotated integrally with the rotor main body 5.

Further, the integral rotation unit 12 is also formed of a different member from the rotor main body 5. As described above, in this configuration, when the convex unit 23 of the integral rotation unit 12 is inserted into the engagement concave unit 6 formed in the rotor main body 5 or another constitutional component of the concave-convex fitting structure 22 for mutual engagement, the integral rotation unit 12 is rotated integrally with the rotor main body 5.

Further, in the present embodiment, as illustrated in FIG. 5, on an inner circumferential surface of the concave unit 8 of the rotor main body 5, a plurality of convex units 59 configured to press-contact the outer circumferential surface of the main body 46 of the second bearing unit 13 to be engaged to hold the second bearing unit 13 to position the second bearing unit 13 relative to the rotor main body 5 (bring the second bearing unit 13 into a fixed state), are provided with intervals in the circumferential direction.

Further, in the present embodiment, in a portion facing the outer circumferential surface of the spindle 9 of the rotor main body 5, that is, a region between the first bearing unit 11 and the second bearing unit 13, a relief 61 with its inner diameter being formed to be larger than the inner diameter of the first bearing unit 11 to not contact the spindle 9, is formed.

According to the embodiment-based motor 1 thus configured, the magnet 3 and the rotor main body 5 can be integrated and fixed by insert molding or the like, based on a reference position, that is, the position of the magnet 3 formed with the notch 86, that is, the positioning marker 85. Thus, it is possible to reduce a positional deviation of the magnetic poles (the N pole 87 and the S pole 89) of the magnet 3 and a positional deviation in manufacture in the circumferential direction R of the rotor main body 5, where the positional deviation is generated at a stage of magnetization in which the N poles 87 and the S poles 89 are alternately arranged in the circumferential direction R with respect to a cylindrically shaped pre-magnetization base material and at a stage of integrating the magnet 3 and the rotor main body 5 by insert molding and the like.

Further, when the concave-convex fitting structure 22 provided in the integral rotation unit 12 and the rotor main body 5 is employed, the integral rotation unit 12 and rotor main body 5 can be assembled in a set relative arrangement, and thus, the integral rotation unit 12 can arrange, via the rotor main body 5, the position of the integral rotation unit 12 relative to the positions of the magnetic poles (the N pole 87 and the S pole 89) of the magnet 3 relative to one reference position, that is, the positioning marker 85 (notch 86). That is, the positional deviation in the circumferential direction R between the integral rotation unit 12 and the rotor main body 5 can be reduced and the error in assembly can be reduced. As a result, accurate rotation of the motor 1 can be stably continued.

(4) Specific Configuration of Valve Drive Device (See FIG. 1 to FIG. 4 and FIG. 12 to FIG. 15)

The valve drive device 31 according to the present embodiment is used, for example, to adjust a supply amount of refrigerant (fluid) S for cooling the inside of a refrigerator. As illustrated in FIG. 1, the valve drive device 31 includes: a valve main body 63 configured to accommodate the motor 1, the base 2, the cover 4, the valve seat 36, the valve element 38, and the valve element drive mechanism 41; the single inflow pipe 43 extending in parallel from the valve main body 63; and the two outflow pipes 45A, 45B.

Further, the valve main body 63 includes an unillustrated connector configured to secure electrical connection with a control device provided outside, and a mounting plate 65 configured to mount the valve drive device 31 into the refrigerator or the like.

Inside the valve main body 63, as described above, the base 2 in a disc-like shape, as an example, and the cover 4 made of a nonmagnetic material (for example, made of stainless steel), as an example, in a stepped cup shape with a large diameter at its lower part and a small diameter at its upper part and configured to cover the base 2, are arranged. Further, an internal space sealed by the base 2 and the cover 4 is the valve chamber 27. Further, the opening 29 is formed in the base 2, and the valve seat 36 is attached by using the opening 29.

In addition, in this configuration, an annular stepped unit 67 is formed on an outer peripheral edge of the base 2, and a flange unit 4b formed on an opened bottom outer peripheral edge of the cover 4 is engaged with and attached to the stepped unit 67.

The valve seat 36 is, for example, a stepped disc-like member having a small diameter at its upper part and a large diameter at its lower part, and the valve seat 36 is formed with the two fluid outlets 35A, 35B penetrating in the longitudinal direction Z of the spindle 9.

Further, a flat top surface of the valve seat 36 is the valve seat surface 37, and the two outflow pipes 45A, 45B are attached to the fluid outlets 35A, 35B, respectively, from below.

Further, at a center of the valve seat 36, a mounting shaft 69 extending in parallel in the longitudinal direction Z of the spindle 9 intersecting the valve seat surface 37, is raised. An upper end of the mounting shaft 69 is supported, as an example, by a support plate (not shown) arranged in the valve chamber 27. It is noted that the axis L1 of the mounting shaft 69 is provided parallel to the axis L of the spindle 9 at a position closer to an outer periphery of the base 2 offset by a fixed distance.

The disc-shaped valve element 38 is rotatably mounted to the mounting shaft 69. The valve element 38 is rotatably plated on the valve seat surface 37 around the axis L1 of the mounting shaft 69.

Figure 14:
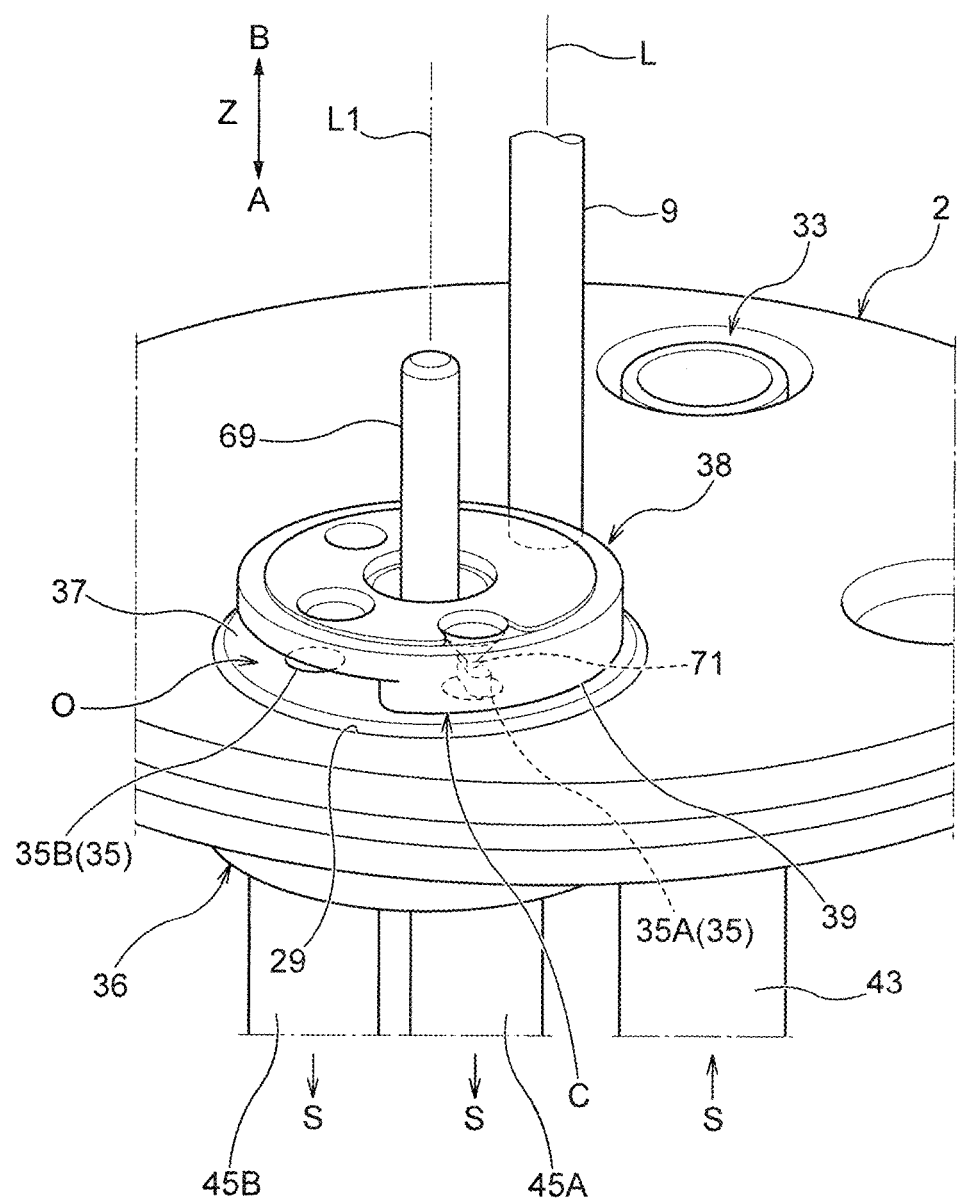
FIG. 14 is a view illustrating at least an embodiment of the present invention or a perspective view illustrating a positional relationship between a base and a valve element.
Figure 15:
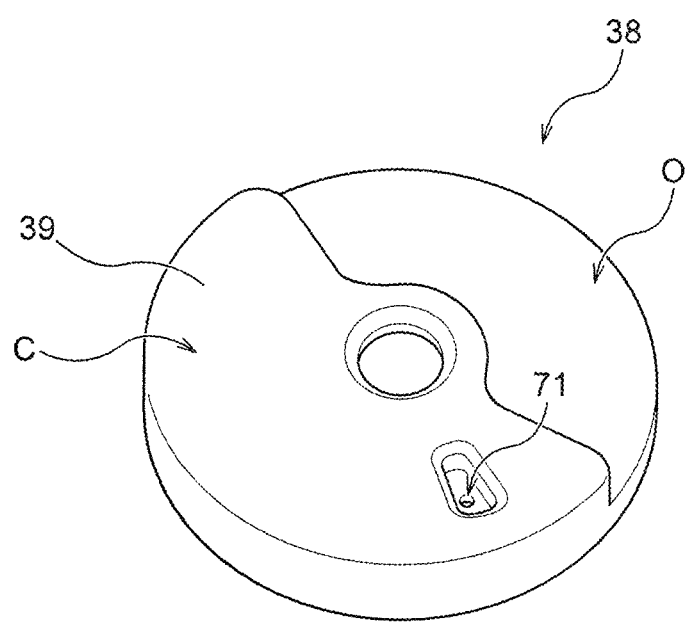
FIG. 15 is a view illustrating at least an embodiment of the present invention or a perspective view illustrating a valve element from a bottom surface side.

As illustrated in FIG. 14 and FIG. 15, the valve element 38 has different cross sectional shapes between its upper part and its lower part, and the upper cross sectional shape is in a circular shape and the lower cross sectional shape is in a fan shape obtained by cutting a part (for example, a range of about 160°) of a circle.

Further, a fan-shaped bottom surface of the valve element 38 is the contact surface 39 contacting the valve seat surface 37, and the fan-shaped portion is a closed region C of the valve element 38 and the remaining cut portion is an opened region O. In addition, in the closed region C of the valve element 38, a throttle hole 71 configured to finely adjust a flow rate of the refrigerant S is formed.

The valve element drive mechanism 41 uses the motor 1 as a drive source, and is configured, as an example, to include a pinion 25 integrally provided in the integral rotation unit 12, a reduction gear 73 configured to mesh with the pinion 25, and further, the valve element 38, at the one end A side of the spindle 9 of the motor 1.

It is noted that the reduction gear 73 has a larger diameter and is formed with a larger number of teeth than those of the pinion 25, and with this configuration, the reduction gear 73 and the pinion 25 constitute the reduction mechanism.

Figure 13:
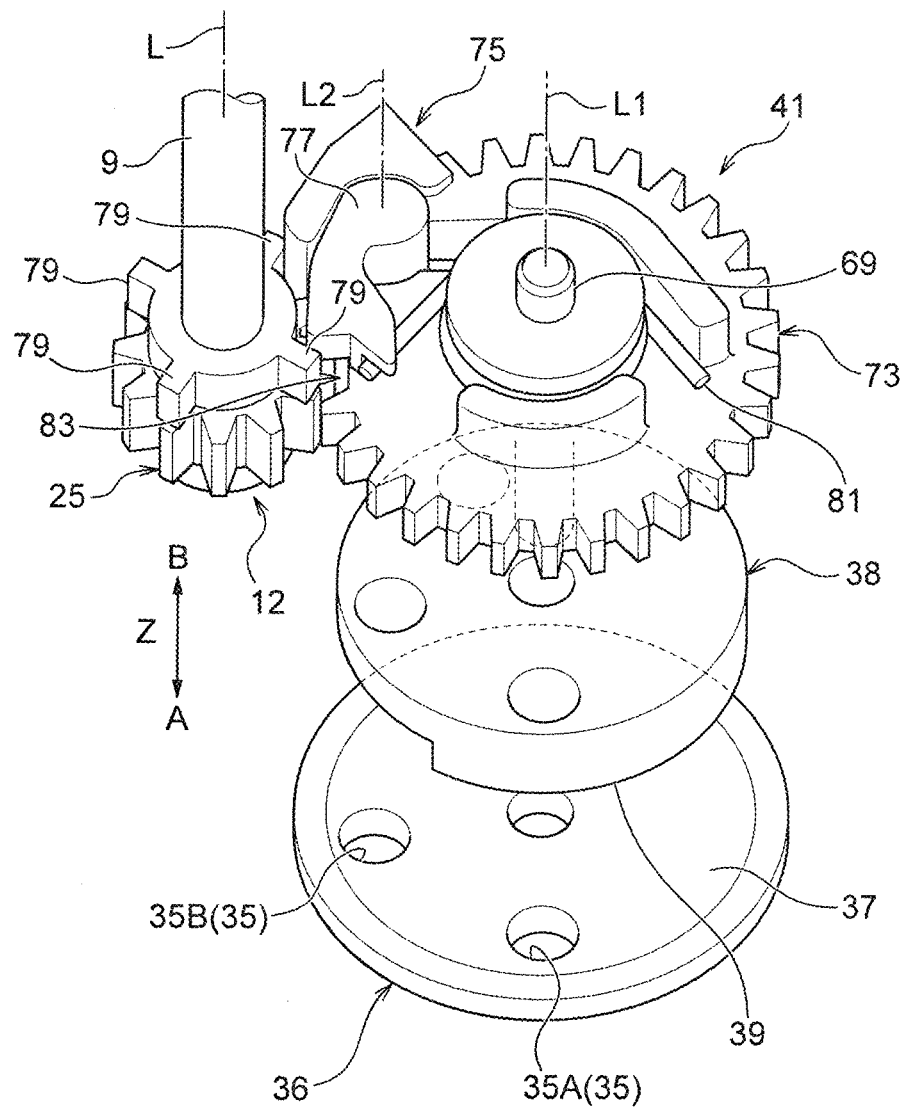
FIG. 13 is a view illustrating at least an embodiment of the present invention or an exploded perspective view illustrating a valve element drive mechanism.

Further, as illustrated in FIG. 13, in the present embodiment, a rotor step-out suppression mechanism 75 is provided as a mechanism for reducing an impact noise generated when the valve element 38 returns to the origin. The rotor step-out suppression mechanism 75 is configured to include, as an example, a lever 77 provided in the reduction gear 73 and configured to pivot around a pivot axis L2, four abutment convex units 79, as an example, extending in parallel to the longitudinal direction Z of the spindle 9 above the pinion 25, and an urging spring 81 including a torsion coil spring, as an example, configured to urge to unceasingly press-contact the lever 77 toward a pinion 25 side.

The integral rotation unit 12 is a power output member including the pinion 25, and is provided with at least one abutment convex unit 79 as described above in a site not interfering with a surface on which the teeth of the pinion 25 exist. In this structure, the abutment convex unit 79 also generates an error in assembly in the magnetic poles (the N pole 87 and the S pole 89) as in the case of the teeth of the pinion 25; however, according to the present embodiment, it is possible to arrange the abutment convex unit 79 relative to one reference position, that is, the positioning marker 85. As a result, the error in assembly between the integral rotation unit 12 including the abutment convex unit 79 and the rotor main body 5 can be reduced.

Further, in this configuration, a toothless unit 83 is formed in the reduction gear 73 at a site attached with the lever 77, and when the toothless unit 83 and the pinion 25 face each other, the pinion 25 rotates idly and the rotation is not transmitted to the reduction gear 73. That is, even if the pinion continues to rotate integrally with the rotor 7, this rotation is idled due to the presence of the toothless unit 83 and is not transmitted to the reduction gear 73. At the time of this idle rotation, the convex unit 79 located above the pinion 25 pushes the lever 77 against a spring force of the urging spring 81 to retreat the lever 77, and as a result, the rotation of the pinion 25 is continued without stepping out.

To perform an opening/closing operation of the valve element 38, when the pinion is rotated in a direction (forward rotation direction) opposite to the aforementioned direction, firstly, the convex unit 79 abuts against an abutted unit of the lever 77, the lever 77 is pushed, and as a result, the reduction gear 73 starts to rotate, the pinion 25 is in a positional relationship to face a gear portion other than the toothless unit 83 of the reduction gear 73 to be in mesh with each other, and thereafter, the power is transmitted from the pinion 25 to rotate the reduction gear 73. As a result, the opening/closing operation of the valve element 38 is performed.

Further, at a bottom surface side of the reduction gear 73 and at a top surface side of the valve element 38, an unillustrated concave-convex engagement structure configured to integrally engaging the reduction gear 73 and the valve element 38 is provided.

Figure 16:
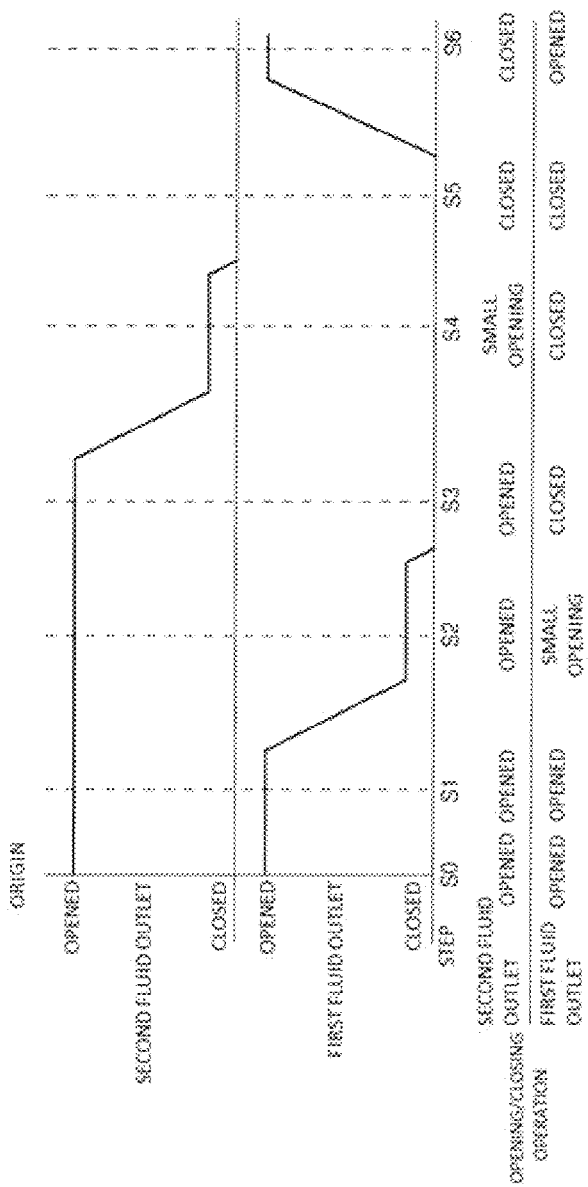
FIG. 16 is a graph showing at least an embodiment of the present invention or graph showing a relationship between a rotation angle (number of step S) of the valve element and an opening/closing operation of the valve element.
Figure 17:
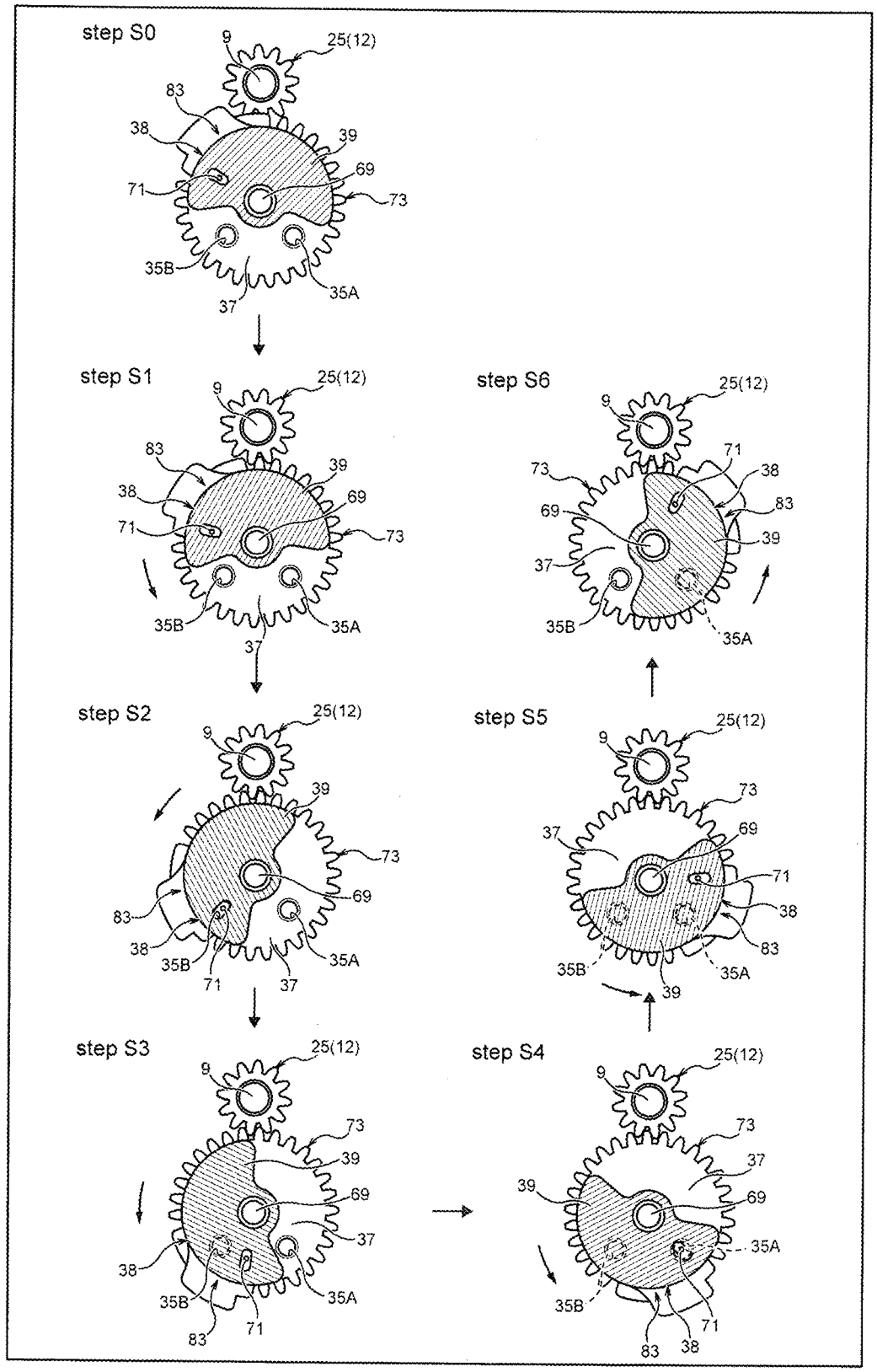
FIG. 17 is a view illustrating at least an embodiment of the present invention where each plan sectional view illustrates a positional relationship between a valve element and a valve seat surface formed when the valve element is rotated in each step in FIG. 16 from an origin position.

(5) Operation Mode of Valve Drive Device (See FIG. 16 and FIG. 17)

Next, an operation mode of the embodiment-based valve drive device configured as described above will be described with a focus on a relationship between a rotation angle (number of step S) of the valve element 38 and the opening/closing operation of the valve element 38.

When a power is supplied to the motor 1 serving as a drive source of the valve drive device 31 and a current in a predetermined direction is passed to the coil 19, the rotor 7 starts to rotate in a forward rotation direction. The rotation of the rotor 7 is transmitted to the pinion 25 provided at a lower end of the integral rotation unit 12 via the concave-convex fitting structure 22 including the engagement concave unit 6 formed in the rotor main body 5 and the convex unit 23 provided in the integral rotation unit 12.

The rotation of the pinion 25 is transmitted to the reduction gear 73 meshing with the pinion 25 in a decelerated state, and is transmitted to the valve element 38 rotating integrally with the reduction gear 73.

The relationship between the rotation angle (number of step S) of the valve element 38 and the opening/closing operation of the valve element 38 is as shown in FIG. 16. First, in a state where the valve element 38 is located at an origin position, the positional relationship between the valve element 38 and the valve seat surface 37 is as illustrated in FIG. 17, the first fluid outlet 35A and the second fluid outlet 35B of the valve seat surface 37 are both in an opened state.

Therefore, the refrigerant S flowing into the valve chamber 27 from the fluid inlet 33 through the inflow pipe 45 passes through the two fluid outlets 35A, 35B and the two outflow pipes 45A, 45B, and a predetermined flow rate is supplied to a cooling duct of the refrigerator.

It is noted that this state is also continued at a position where the valve element 38 illustrated in FIG. 17 is rotated from the origin position (step S0) in a forward rotation direction of step S1.

At the position where the valve element 38 is rotated in a forward rotation direction of step S2 from the origin position illustrated in FIG. 17, the first fluid outlet 35A is still in the opened state; however, a majority of the second fluid outlet 35B is blocked by the contact surface 39 of the valve element 38.

However, at this position, the throttle hole 71 formed in the valve element 38 communicates with the second fluid outlet 35B, and thus, a restricted flow rate of the refrigerant S flowing through the throttle hole 71 flows into the second fluid outlet 35B.

Further, when the valve element 38 rotates in the forward rotation direction to arrive at a rotational position of step S3 from the origin position illustrated in FIG. 17, the positions of the throttle hole 71 and the second fluid outlet 35B are shifted, and thus, the first fluid outlet 35A is in the opened state, and the second fluid outlet 35B is in the closed state.

Further, when the valve element 38 rotates in the forward rotation direction to arrive at a rotational position of step S4 from the origin position illustrated in FIG. 17, in turn, the positions of the throttle hole 71 and the first fluid outlet 35A coincide with each other, the restricted flow rate of the refrigerant S flowing through the throttle hole 71 flows into the first fluid outlet 35A. It is noted that the second fluid outlet 35B is still in the closed state.

Further, when the valve element 38 rotates in the forward rotation direction to arrive at a rotational position of step S5 from the origin position illustrated in FIG. 17, the positions of the throttle hole 71 and the first fluid outlet 35A are shifted, and thus, the first fluid outlet 35A and the second fluid outlet 35B are both in the closed state.

Then, when the valve element 38 rotates in the forward rotation direction to arrive at a rotational position of step S6 from the origin position illustrated in FIG. 17, the second fluid outlet 35B blocked by the contact surface 39 of the valve element 38 is in an opened state, and the first fluid outlet 35A continues to be in the closed state. As a result, a series of opening/closing operation by the valve element 38 are completed.

When the valve element 38 reaches a rotational position of step S6 in the forward rotation direction from the origin position illustrated in FIG. 17, the rotation direction of the motor 1 is reversed, and the valve element 38 is rotated in a reverse rotation direction. Then, when the valve element 38 returns to the origin position illustrated in FIG. 17, and further, the valve element 38 is rotated in the reverse rotation direction, the pinion 25 faces the toothless unit 83 of the reduction gear 73 and the meshing of the both is released, and as a result, the aforementioned rotor step-out suppression mechanism 75 is actuated to reduce the impact generated when the valve element 38 returns to the origin position to suppress the generation of noise.

Next, when the motor 1 is rotated in the forward rotation direction, the power is transmitted to the reduction gear 73 via the rotor step-out suppression mechanism 75 to be rotated to restore a state where the pinion 25 and the reduction gear 73 mesh with each other in FIG. 17.

According to the embodiment-based valve drive device 31 configured as described above, it is possible to provide the valve drive device 31 including the motor 1 with a small error generated at the time of magnetization of the magnet 3, at the time of integral molding of the magnet 3 and the rotor main body 5, and at the time of assembly of the rotor main body 5 and the integral rotation unit 12.

In addition, the manufacture and the assembly of the motor 1 with a small deviation allow a smooth valve operation of the valve element 38 with a small noise to be executed.

[Other Embodiments]

The motor 1 and the valve drive device 31 according to at least an embodiment of the present invention are basically configured as described above, but it is of course possible to modify, omit, etc., a partial configuration within the scope of the invention of the present application.

For example, the number of elastic arm units 49 is three in the above embodiment, but may be two or four or more. In addition, the elastic bearing unit 15 may be configured of another component (for example, elastically deformable synthetic rubber and urethane rubber) other than the elastic arm unit 49.

Moreover, although the second bearing unit 13 and the rotor main body 5 are configured of different members in the embodiment, the second bearing unit 13 and the rotor main body 5 can be formed by integral molding.

Further, in the above embodiment, although the integral rotation unit 12 is applied to the rotor main body 5 arranged via the first bearing unit 11 and the second bearing unit 13 on the cantilever type spindle 9, It is also possible to apply the integral rotation unit 12 to the rotor main body 5 arranged on the spindle 9 having a both end support mechanism.

In the above embodiment, the configuration where the fluid outlet 35 is provided for the valve seat surface 37 is adopted; however, a configuration may be employed where the fluid inlet 33 is provided for the valve seat surface 37 and the fluid outlet 35 is provided in other parts of the base 2.

Further, in the above embodiment, although a configuration of a deceleration system in which the output of the motor 1 is reduced by using the pinion 25 and the reduction gear 73 as the valve element drive mechanism 41 and transmitted to the valve element 38 is adopted; however, it is also possible to omit the pinion 25 and the reduction gear 73 and adopt a direct-acting valve element drive mechanism 41 configured to directly transmit the rotation of the rotor 7 to the valve element 38.

In this case, the rotor step-out suppression mechanism 75 having the above-described configuration cannot be used. Therefore, if the impact occurs when the valve element 38 is returned to the origin, another configuration for reducing the impact is required.

Further, although the positioning marker 85 adopts the notch 86 configured by the groove unit of the U-shaped cross section in the embodiment described above, the positioning marker 85 may be the notch 86 configured by a groove unit having a V-shaped cross section, a groove unit having a cross section with a shape obtained by reversing a base and an upper side of a trapezoid, or a groove unit having a rectangle cross section. Further, the positioning marker 85 may be provided not on the bottom surface side of the magnet 3 but on the top surface side, or the positioning marker 85 may be provided on both the bottom surface side and the top surface side of the magnet 3. Moreover, the positioning marker 85 may be configured of various shapes of a concave unit, a hole, or a convex unit, instead of such a notch 86.

Further, the positioning marker 85 may be a marker not visible, in addition to such a visible marker. Specifically, the marker may be identifiable for positioning a structure of a magnetizing machine or a forming machine by a magnetic force, it may be a marker capable of positioning in the circumferential direction R between the magnet 3 and the rotor main body 5 by transmission or reflection of light.

Further, as the shape of the convex unit 23 of the integral rotation unit 12 fitted to the engagement concave unit 6 of the rotor main body 5, a curved plate-like shape is adopted in the embodiment; however, in addition thereto, a rod-shaped convex unit 23 having various cross-sectional shapes, or a plate-like shaped convex unit 23 may be possible.

Moreover, the motor 1 where the configuration illustrated in FIG. 8A and the configuration illustrated in FIG. 8B mentioned in the description of the embodiment are combined may be possible, and the valve drive device 31 including such motor 1 may be possible. In addition, at least one engagement concave unit 6 provided in the rotor main body 5 and at least one convex unit 23 provided in the integral rotation unit 12 may suffice, and unlike in the embodiment, the three components each may not necessarily be needed.

What is claimed is:

1. A motor, comprising:
   a rotor comprising a magnet fixed to an outer periphery of a rotor main body and an integral rotation unit assembled to the rotor main body; and
   a spindle configured to rotatably support the rotor,
   wherein the magnet comprises a positioning marker that is used when the rotor main body is fixed to the magnet,
   wherein the integral rotation unit and the rotor main body are configured to be assembled in a set relative arrangement,
   wherein the integral rotation unit and the rotor main body are fixed by fitting at least one concave unit and at least one convex unit to each other,
   wherein the at least one concave unit and the at least one convex unit are each formed in plurality,
   wherein one of the plurality of concave units is different in shape from the other concave units,
   wherein one of the plurality of convex units is different in shape from the other convex units, and
   wherein the integral rotation unit and the rotor main body are capable of being assembled in a relative arrangement in which the one concave unit and the one convex unit are fitted to each other.

2. The motor according to claim 1, wherein the rotor main body is fixed to the magnet by insert molding.

3. The motor according to claim 1, wherein the positioning marker is a notch formed in the magnet.

4. The motor according to claim 1, wherein the positioning marker is provided at a position where magnetic poles are switched in a circumferential direction of the magnet.

5. The motor according to claim 1, wherein the at least one concave unit is formed in the rotor main body, and the at least one convex unit is formed in the integral rotation unit.

6. The motor according to claim 1, wherein the integral rotation unit is a power output member provided with a pinion, and is provided with at least one abutment convex unit in a site not interfering with a surface where teeth of the pinion are present.

7. A valve drive device comprising:
   a base including a fluid inlet, a fluid outlet, and a valve seat surface, at least one of the fluid inlet and the fluid outlet being opened at the valve seat surface;
   a cover configured to define, between the valve seat surface and the cover, a valve chamber with which the fluid inlet and the fluid outlet communicate;
   a valve element rotatably arranged in the valve chamber, having a contact surface sliding on the valve seat surface, and configured to rotate to switch a flow path of a fluid; and
   a valve element drive mechanism configured to rotate the valve element about an axis orthogonal to the valve seat surface,
   wherein the valve element drive mechanism rotates the valve element by using, as a power source, the motor according to claim 1.

8. The valve drive device according to claim 7,
   wherein one end of the spindle of the motor is fixed non-rotatably to the base,
   wherein a power output member including a pinion arranged between the base and the rotor main body at the one end side of the spindle is provided, and
   wherein the valve element is configured to rotate via a reduction gear meshing with the pinion.

9. A motor, comprising:
   a rotor comprising a magnet fixed to an outer periphery of a rotor main body and an integral rotation unit assembled to the rotor main body; and
   a spindle configured to rotatably support the rotor,
   wherein the magnet comprises a positioning marker that is used when the rotor main body is fixed to the magnet,
   wherein the integral rotation unit and the rotor main body are configured to be assembled in a set relative arrangement,
   wherein the integral rotation unit and the rotor main body are fixed by fitting at least one concave unit and at least one convex unit to each other,
   wherein the at least one concave unit and the at least one convex unit are each formed in plurality,
   wherein a circumferential spacing for a set including a concave unit among the plurality of concave units is different in length from another circumferential spacing for a different set including a different concave unit,
   wherein a circumferential spacing for a set including a convex unit among the plurality of convex units is different in length from another circumferential spacings for a different set including a different convex unit, and
   wherein the integral rotation unit and the rotor main body are capable of being assembled in a relative arrangement in which the sets including the concave units and the convex units, which are positioned with the different spacings in length therebetween, are fitted to each other.

10. A valve drive device comprising:
    a base including a fluid inlet, a fluid outlet, and a valve seat surface, at least one of the fluid inlet and the fluid outlet being opened at the valve seat surface;
    a cover configured to define, between the valve seat surface and the cover, a valve chamber with which the fluid inlet and the fluid outlet communicate;
    a valve element rotatably arranged in the valve chamber, having a contact surface sliding on the valve seat surface, and configured to rotate to switch a flow path of a fluid; and
    a valve element drive mechanism configured to rotate the valve element about an axis orthogonal to the valve seat surface,
    wherein the valve element drive mechanism rotates the valve element by using, as a power source, the motor according to claim 9.

11. The valve drive device according to claim 10,
    wherein one end of the spindle of the motor is fixed non-rotatably to the base,
    wherein a power output member including a pinion arranged between the base and the rotor main body at the one end side of the spindle is provided, and
    wherein the valve element is configured to rotate via a reduction gear meshing with the pinion.

* * * * *